(12) United States Patent
Ben Romdhane et al.

(10) Patent No.: US 9,262,278 B2
(45) Date of Patent: Feb. 16, 2016

(54) ALLOCATION OF REPLICA-SETS IN A STORAGE CLUSTER

(71) Applicant: eBay Inc., San Jose, CA (US)

(72) Inventors: Sami Ben Romdhane, San Jose, CA (US); Rami El-Charif, San Jose, CA (US); Bhaven Avalani, Cupertino, CA (US)

(73) Assignee: eBay Inc., San Jose, CA (US)

( * ) Notice: Subject to any disclaimer, the term of this patent is extended or adjusted under 35 U.S.C. 154(b) by 108 days.

(21) Appl. No.: 13/946,551

(22) Filed: Jul. 19, 2013

(65) Prior Publication Data

US 2015/0026517 A1  Jan. 22, 2015

Related U.S. Application Data

(60) Provisional application No. 61/677,170, filed on Jul. 30, 2012.

(51) Int. Cl.
*G06F 11/00* (2006.01)
*G06F 11/14* (2006.01)
*G06F 11/20* (2006.01)

(52) U.S. Cl.
CPC ........ *G06F 11/1458* (2013.01); *G06F 11/2094* (2013.01)

(58) Field of Classification Search
CPC ............ G06F 11/1458; G06F 11/1076; G06F 11/1008; G06F 11/1092; G06F 11/2094
USPC .................................................. 714/15, 6.22
See application file for complete search history.

(56) References Cited

U.S. PATENT DOCUMENTS

| | | | |
|---|---|---|---|
| 6,836,820 B1 * | 12/2004 | Viswanathan et al. | 711/114 |
| 2006/0277362 A1 * | 12/2006 | DeCenzo | 711/114 |
| 2014/0007239 A1 * | 1/2014 | Sharpe | G06F 21/561 726/24 |
| 2014/0019813 A1 * | 1/2014 | McLean | G06F 17/30575 714/47.3 |

OTHER PUBLICATIONS

"Non-standard_RAID_levels" wikipedia page, retrieved from https://web.archive.org/web/20120608221434/http://en.wikipedia.org/wiki/Non-standard_RAID_levels.*

(Continued)

*Primary Examiner* — Yair Leibovich
(74) *Attorney, Agent, or Firm* — Schwegman Lundberg & Woessner, P.A.

(57) ABSTRACT

A data storage system may be configured to allocate replica-sets in a balanced manner and mark some of these balanced replica-sets as being spares. As one or more drives or machines fail, the data storage system may move all copies of an affected replica-set to a marked spare replica-set and mark the affected replica-set as being inactive or invalid. As the failed drives are replaced, the data storage system may reconfigure those inactive replica-sets and use them as new spares. The data storage system may implement a coordinator module that handles the balancing and allocation of spares within a sub-cluster. The coordinator may also reallocate entire replica-sets across sub-clusters to maintain balance at the cluster level.

19 Claims, 7 Drawing Sheets

(56) References Cited

OTHER PUBLICATIONS

"Glossary—MongoDB Manual 2.4.4", [Online]. Retrieved from the Internet: <URL: http://docs.mongodb.org/manual/reference/glossary/#term-replica-set>, (Accessed Jun. 6, 2013), 11 pgs.

"Replica Set Fundamental Concepts—MangoDB Manual 2.4.4", [Online]. Retrieved from the Internet: <URL: http://docs.mongodb.org/manual/core/replication/>, 7 pgs.

* cited by examiner

ALLOCATION OF REPLICA-SETS IN A STORAGE CLUSTER

RELATED APPLICATIONS

This application claims the priority benefit of U.S. Provisional Patent Application No. 61/677,170, filed Jul. 30, 2012, which is incorporated herein by reference in its entirety.

TECHNICAL FIELD

The subject matter disclosed herein generally relates to the processing of data. Specifically, the present disclosure addresses systems and methods to facilitate data management.

BACKGROUND

A data storage system may form all or part of a network-based provider of cloud-based storage or computing services. Such a data storage system may include one or more data storage machines (e.g., server machines) with various data storage drives (e.g., disk drives, flash drives, or other storage drives). Data storage machines and their drives may be physically organized (e.g., arranged) into one or more racks (e.g., of machines, devices, or both). Data storage machines and their drives may be logically organized (e.g., configured) into one or more volumes (e.g., logical volumes) of data. The various data storage machines may be configured to operate as a single data storage system.

A data storage system may implement data replication (e.g., making one or more copies of data objects) to improve fault tolerance. For example, in the event that a data object (e.g., a data volume or a block or sector of a disk drive) becomes unusable (e.g., due to data corruption, network outage, or hardware failure), a replicated copy of that data object may be used instead.

BRIEF DESCRIPTION OF THE DRAWINGS

Some embodiments are illustrated by way of example and not limitation in the figures of the accompanying drawings.

DETAILED DESCRIPTION

Figure 1:
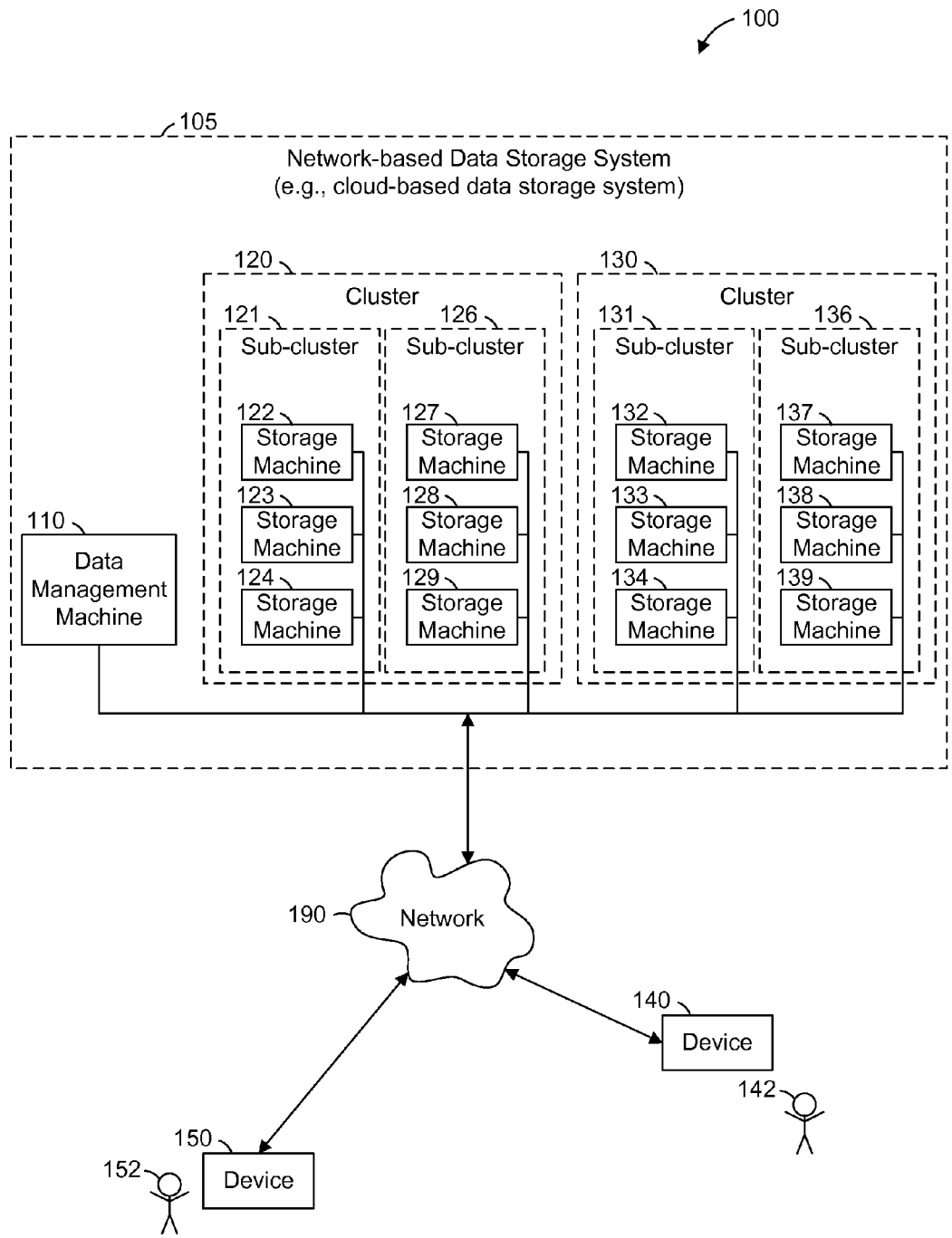
FIG. 1 is a network diagram illustrating a network environment suitable for allocation of replica-sets in a cluster of storage machines, according to some example embodiments.

Example methods and systems are directed to allocation of replica-sets in a storage cluster. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

"Cluster" herein means an object storage cluster of machines. A cluster may include (e.g., be built out of) multiple smaller sub-clusters.

"Sub-cluster" herein means a smaller self-contained unit of machines that, when grouped (e.g., stitched) together with other sub-clusters, form a cluster. In some example embodiments, all replicas for a given data object are stored (e.g., reside or "live") in the same sub-cluster. Moreover, a sub-cluster may be located (e.g., reside or "live") in one datacenter.

"Sub-cluster buddies" herein refers to sub-clusters that correspond to each other for recovery and availability purposes. Multiple sub-clusters may be "buddied up" across datacenters for disaster recovery and availability, and such a sub-cluster may be identified by a unique sub-cluster identifier (ID) across all datacenters.

"Data volume" (also known as "volume") herein refers to a unit of storage. A data volume may contain many objects. One or more administrative operations may be performed with respect to one or more data volumes (e.g., at the volume level), in contrast to performing operations with respect to one or more replica-sets (e.g., at the replica-set level). A data volume may be identified by a unique volume ID within a datacenter.

"Spare" herein refers to unused space in a sub-cluster that is used to recover data (e.g., when data is lost or corrupt).

"Replica-set" herein refers to a group of volumes configured to provide mutual redundancy (e.g., configured to be mirrored) across multiple machines (e.g., within a sub-cluster), multiple datacenters (e.g., among buddy sub-clusters), or any suitable combination thereof. A replica-set may be identified by a unique replica-set ID across all datacenters.

"Object" herein refers to a unit of data submitted by a storage user and identified by a unique ID across an entire cluster.

In various situations involving data storage systems (e.g., a data storage system that forms all or part of a network-based provider of cloud-based storage or computing services), a goal of balancing replica-sets may be in tension with another goal of keeping the data storage system balanced as failures occur and data is moved around within the data storage system. For example, a data storage system may be configured to balance replica-sets across multiple datacenters, racks, machines, drives (e.g., disks), volumes, or any suitable combination thereof, while minimizing overlap across machines (e.g., a uniform distribution with minimal overlap) and minimizing recovery time (e.g., maximum parallelism when copying data from as many machines as possible), and while also maximizing availability (e.g., data spread on as many machines as possible and across failure domains) and maximizing performance (e.g., data on as many drives as possible). In addition, it may be beneficial to keep a data storage system balanced (e.g., overall) as drives and machines fail and data is migrated around (e.g., shuffled around various machines and drives due to various failures).

In some situations, a data storage system creates replica-sets out of data volumes to achieve a perfect initial allocation that diverges slowly as drives fail and data moves around. In order to recover from various failures, such a data storage system may perform continuous defragmentation with the goal of restoring the optimal setup from the initial allocation.

This approach may be similar to that used in consumer-grade disk drive defragmentation software.

As another approach, example embodiments of a data storage system may allocate replica-sets that are perfectly balanced (e.g., in a desired, optimized, predetermined, or perfect initial allocation) and mark some of these perfectly balanced replica-sets as being spares. As one or more drives or machines fail, the data storage system may move (e.g., migrate) copies (e.g., all copies) of an affected (e.g., impacted) replica-set to a marked spare replica-set and mark the affected replica-set as being invalid. As the failed drives are replaced, the data storage system may rebuild those invalid replica-sets and use the rebuilt replica-sets as new spares (e.g., by marking them as newly available spares). Although this approach may involve copying more data when a drive fails, according to various example embodiments, this approach may reduce or eliminate the risk of reshuffling an entire data set (e.g., multiple replica-sets) in order to defragment it and optimize it at a later time.

In some example embodiments, a data storage system implements a coordinator (e.g., a process or a software module that configures a processor of a machine within the data storage system to perform one or more operations) that handles the balancing and allocation of spares within a sub-cluster. The coordinator may also move (e.g., migrate) entire replica-sets across sub-clusters in order to maintain balance at the cluster level. In particular, the coordinator may operate, for example, as follows:

(1) When a drive or machine fails in a sub-cluster "scl," the coordinator finds a spare replica-set in "scl" and copies the data from the affected replica-set "RSfail" to the spare replica-set.

(2) The coordinator marks the remaining drives or machines in "RSfail" as inactive until the bad drive or machine is replaced. When the bad drive or machine is replaced, the coordinator marks "RSfail" as being available for future use as a spare.

(3) As various failures of drives, machines, or both, occur over time, the coordinator monitors the percentage of available spares (e.g., the spare percentage) across all sub-clusters of a given cluster, and determines whether to move (e.g., migrate) one or more replica-sets between or among the sub-clusters to balance (e.g., rebalance) the cluster. For example, a data storage system may start with a 15% spare policy (e.g., as part of an initial allocation of replica-sets to clusters). As failures occur and while repairs are pending, this percentage may decrease on an individual basis for every affected sub-cluster. According to various example embodiments, the coordinator is configured to balance (e.g., rebalance) the replica-sets such that every sub-cluster has a minimum number of spare replica-sets available. This may have the effect of enabling fast recoveries of failures within a sub-cluster.

(4) As repairs are performed (e.g., done or conducted) to recover from the various failures, the coordinator is configured to perform a low priority balancing (e.g., rebalancing) process in the background. This background balancing process is configured to gradually restore the initial 15% spare policy across all sub-clusters.

FIG. 1 is a network diagram illustrating a network environment 100, according to some example embodiments. The network environment 100 includes a data management machine 110, storage machines 122, 123, 124, 127, 128, 129, 132, 133, 134, 137, 138, and 139, and devices 140 and 150, all communicatively coupled to each other via a network 190. The data management machine 110, the storage machines 122, 123, 124, 127, 128, 129, 132, 133, 134, 137, 138, and 139, and devices 140 and 150 may each be implemented in a computer system, in whole or in part, as described below with respect to FIG. 7.

As shown, the data management machine 110, with or without one or more of the storage machines 122, 123, 124, 127, 128, 129, 132, 133, 134, 137, 138, and 139, may form all or part of a network-based data storage system 105. For example, the network-based data storage system 105 may be a cloud-based data storage system that provides one or more data storage services (e.g., to devices 140 and 150) from a cloud computing environment.

As illustrated in FIG. 1, the storage machines 122, 123, 124, 127, 128, 129, 132, 133, 134, 137, 138, and 139 may be organized into clusters 120 and 130 and further organized into sub-clusters 121, 126, 131, and 136. For example, the cluster 120 may include the sub-clusters 121 and 126. The sub-cluster 121 may include the storage machines 122, 123, and 124. The sub-cluster 126 may include the storage machines 127, 128, and 129. Similarly, the cluster 130 may include the sub-clusters 131 and 136. The sub-cluster 131 may include the storage machines 132, 133, and 134, while the sub-cluster 136 may include the storage machines 137, 138, and 139.

Also shown in FIG. 1 are users 142 and 152. One or both of the users 142 and 152 may be a human user (e.g., a human being), a machine user (e.g., a computer configured by a software program to interact with the device 140), or any suitable combination thereof (e.g., a human assisted by a machine or a machine supervised by a human). The user 142 is not part of the network environment 100, but is associated with the device 140 and may be a user of the device 140. For example, the device 140 may be a desktop computer, a vehicle computer, a tablet computer, a navigational device, a portable media device, or a smart phone belonging to the user 142. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines and devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 7. Moreover, any two or more of the machines or devices illustrated in FIG. 1 may be combined into a single machine, and the functions described herein for any single machine or device may be subdivided among multiple machines or devices.

The network 190 may be any network that enables communication between or among machines and devices (e.g., between the data management machine 110 and the storage machine 122, or between the network-based data storage system 105 and the device 140). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
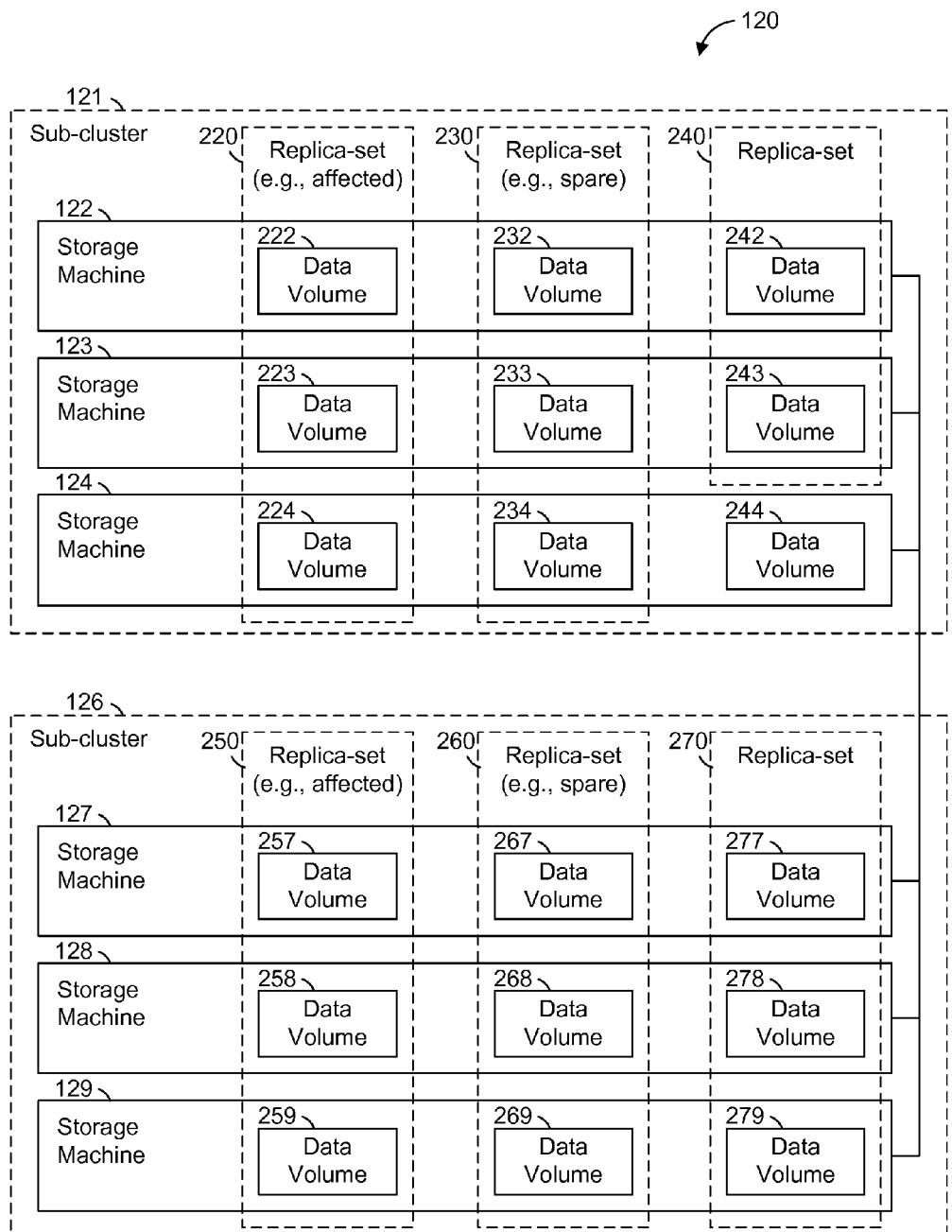
FIG. 2 is a block diagram illustrating a cluster of storage machines (e.g., storage cluster), according to some example embodiments.

FIG. 2 is a block diagram illustrating the cluster 120 as an example of a storage cluster (e.g., a cluster of storage machines), according to some example embodiments. As noted above, the sub-clusters 121 and 126 are included in the cluster 120.

As noted above, the sub-cluster 121 may contain the storage machines 122, 123, and 124. One or more data volumes may be included in each storage machine. For example, data volumes 222, 232, and 242 may be included in the storage machine 122; data volumes 223, 233, and 243 may be included in the storage machine 123; and data volumes 224, 234, and 244 may be included in the storage machine 124.

Similarly, the sub-cluster 126 may contain the storage machines 127, 128, and 129. As shown in FIG. 2, data volumes 257, 267, and 277 may be included in the storage machine 127; data volumes 258, 268, and 278 may be included in the storage machine 128; and data volumes 259, 269, and 279 may be included in the storage machine 129.

Some or all of the data volumes within a sub-cluster may be configured as one or more replica-sets. As illustrated in FIG. 2, the data volumes 222, 223, and 224 may be configured as a replica-set 220 (e.g., an active replica-set that is marked as being in normal use, or an inactive replica-set that is marked as being affected by a failed data volume). That is, the data volumes 222, 223, and 224 may be configured to provide mutual data redundancy (e.g., configured to mirror each other's data) across their respective storage machines 122, 123, and 124. In a likewise manner, the data volumes 232, 233, and 234 may be configured as a replica-set 230 (e.g., a spare replica-set that is marked as being unused or available for use). Similarly, the data volumes 242 and 243 may be configured as a replica-set 240 (e.g., a spare replica-set or an active replica-set).

As further illustrated in FIG. 2, the data volumes 257, 258, and 259 may be configured as a replica-set 250 (e.g., an active replica-set or an inactive or affected replica-set). That is, the data volumes 257, 258, and 259 may provide mutual data redundancy to each other (e.g., by mirroring each other's data). Likewise, the data volumes 267, 268, and 269 may constitute a replica-set 260 (e.g., a spare replica-set). Similarly, the data volumes 277, 278, and 279 may be included in a replica-set 270 (e.g., a spare replica-set or an active replica-set).

Figure 3:
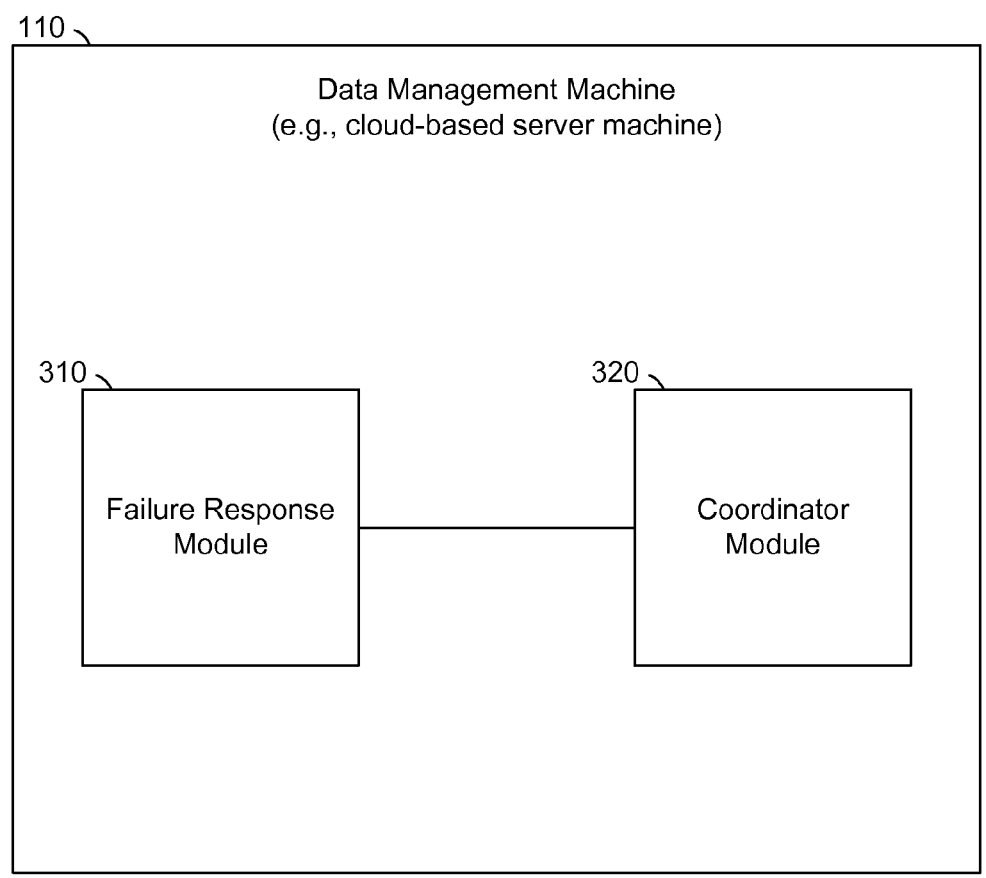
FIG. 3 is a block diagram illustrating components of a data management machine, according to some example embodiments.

FIG. 3 is a block diagram illustrating components of the data management machine 110, according to some example embodiments. The data management machine 110 may be a cloud-based server machine configured (e.g., by one or more modules, any one or more of which may include software) to provide one or more data management services. Such a data management service may include management, maintenance, control, configuration, or other administration of various storage machines (e.g., storage machines 122, 123, 124, 127, 128, 129, 132, 133, 134, 137, 138, and 139). The data management machine 110 is shown as including a failure response module 310 and a coordinator module 320, both configured to communicate with each other (e.g., via a bus, shared memory, or a switch). Any one or more of the modules described herein may be implemented using hardware (e.g., a processor of a machine, such as described below with respect to FIG. 7) or a combination of hardware and software. For example, any module described herein may configure a processor to perform the operations described herein for that module. Moreover, these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
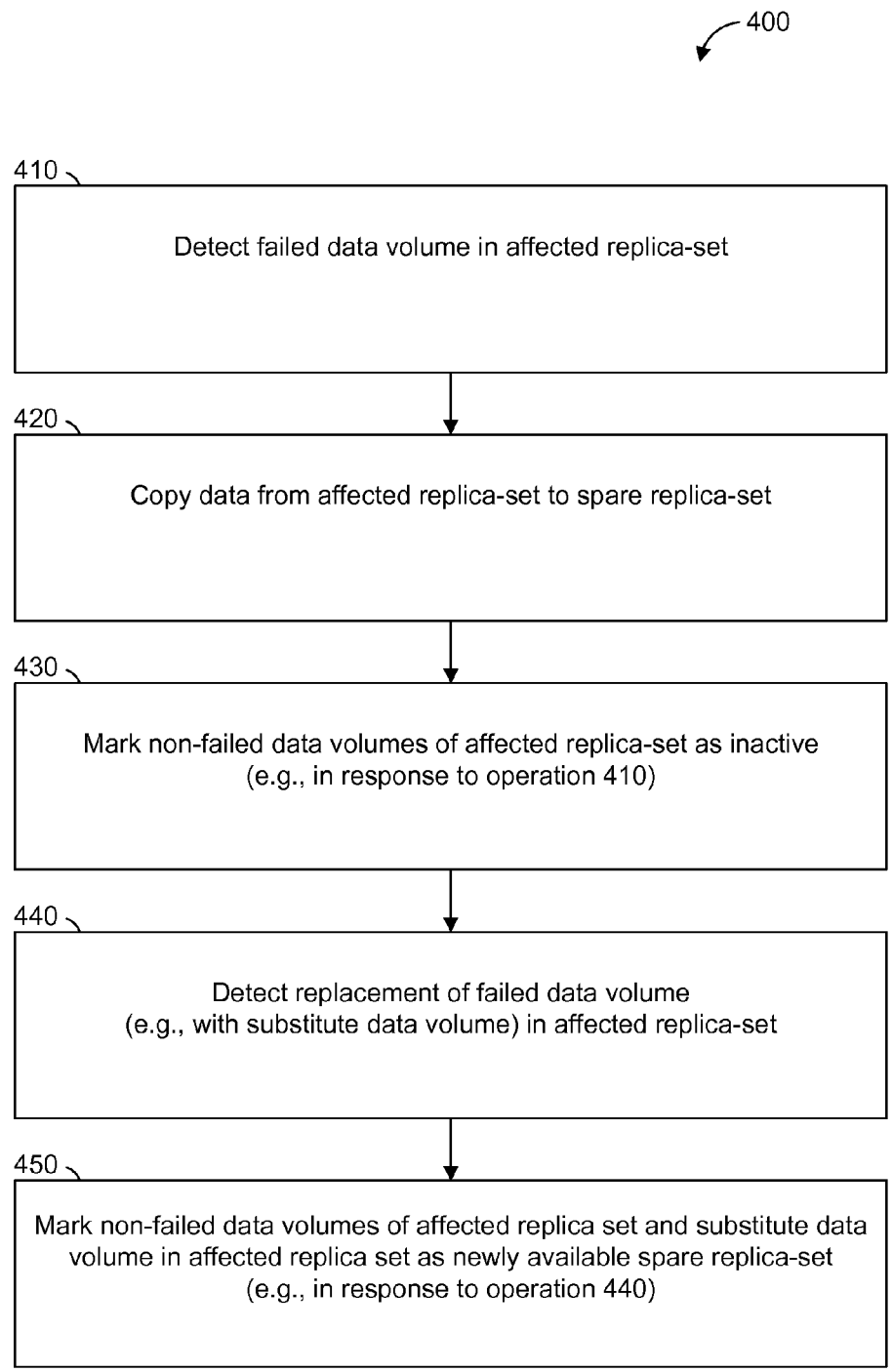
FIG. 4-6 are flowcharts illustrating operations of the data management machine, according to some example embodiments.
Figure 5:
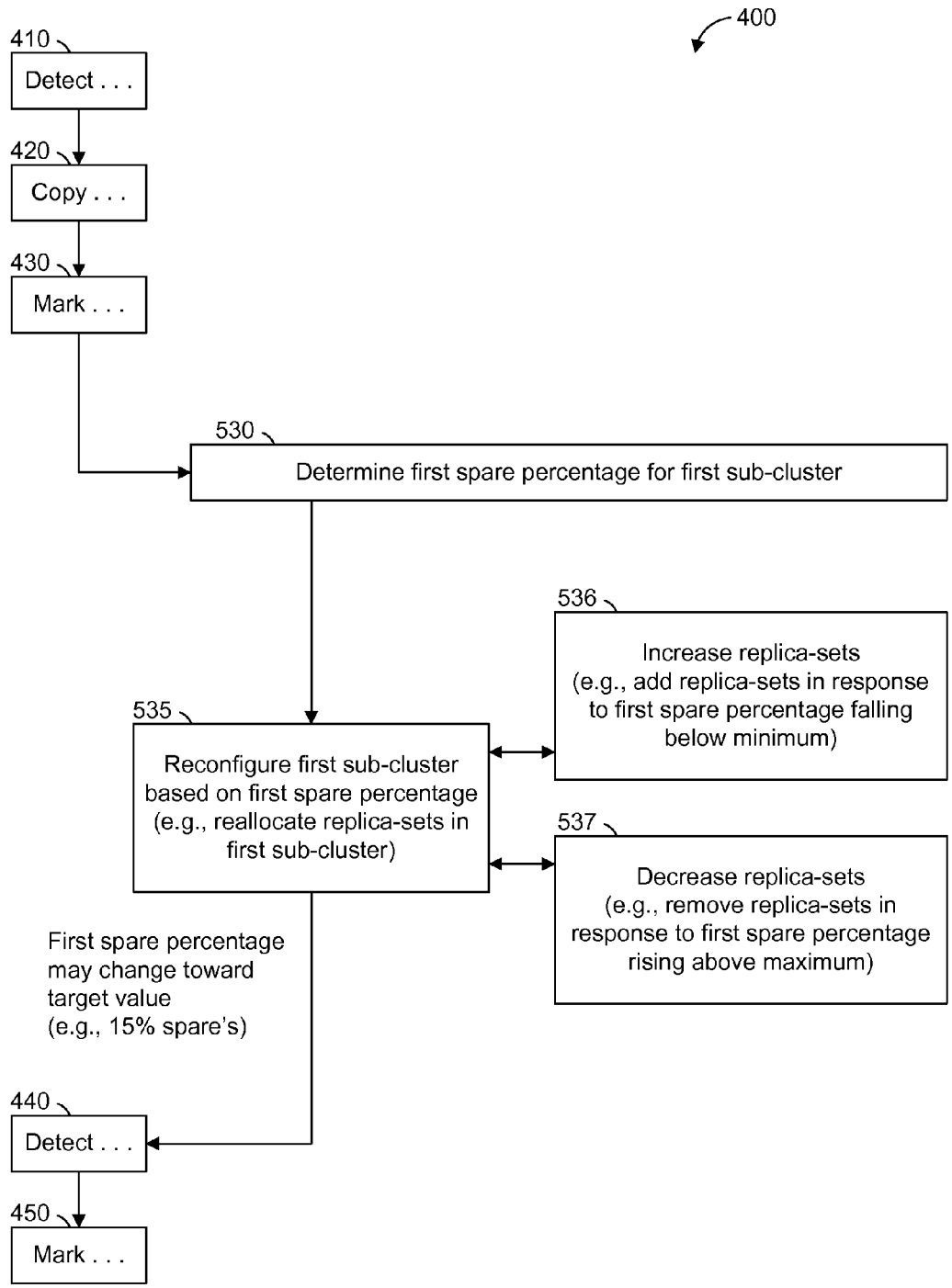
Figure 6:
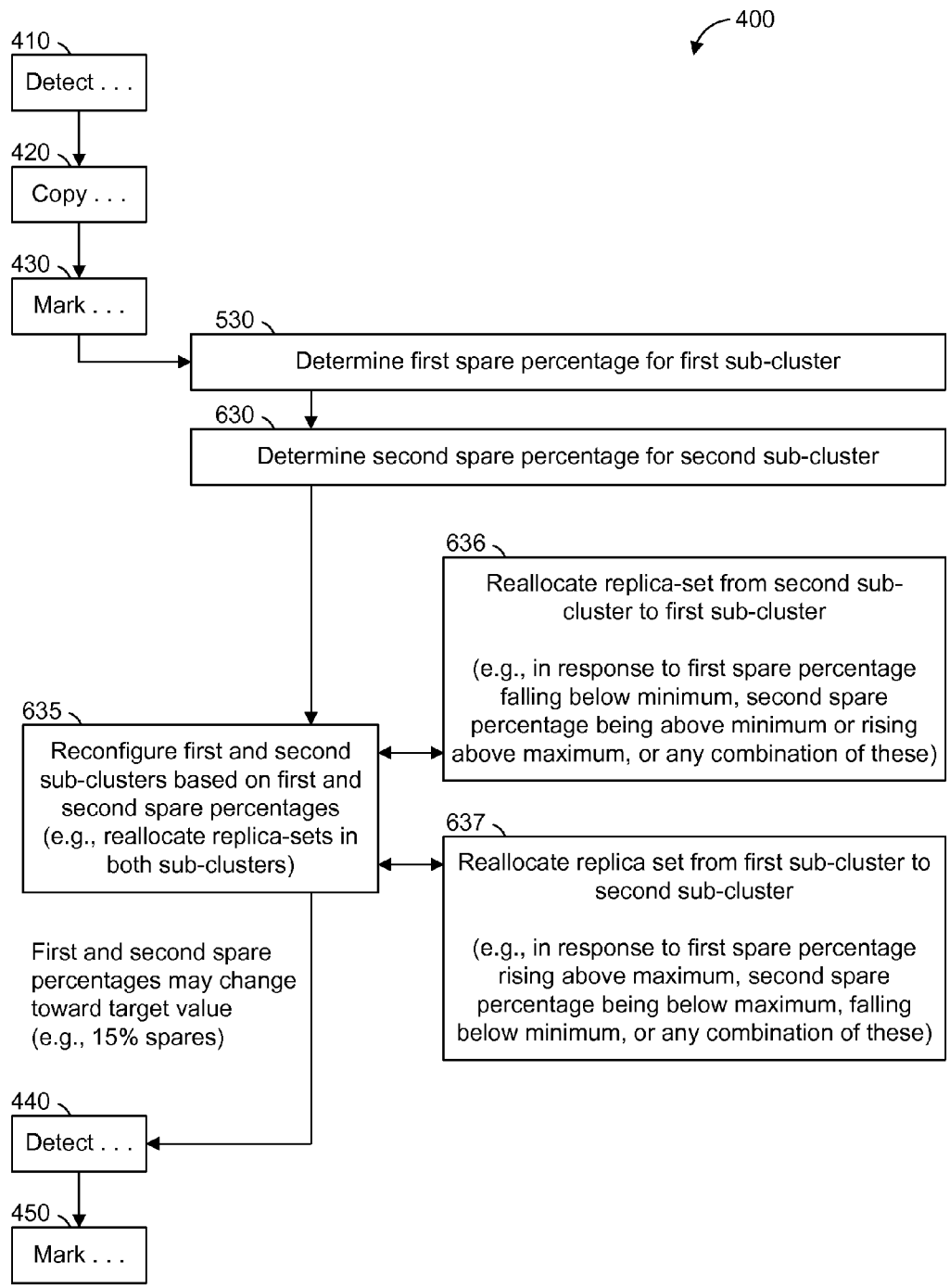

FIG. 4-6 are flowcharts illustrating operations of the data management machine 110, according to some example embodiments. Operations of the method 400 may be performed by the data management machine 110, using modules described above with respect to FIG. 3. As shown in FIG. 4, the method 400 includes operations 410, 420, 430, 440, and 450.

In operation 410, the failure response module 310 detects a failed data volume (e.g., data volume 222). For example, supposing that the data volume 222 suddenly becomes unusable (e.g., due to data corruption, network outage, or hardware malfunction), the failure response module 310 may detect such a failure of the data volume 222 in the sub-cluster 121 within the cluster 120. With the data volume 222 being the failed data volume, the sub-cluster 121 is the affected sub-cluster, and the replica-set 220 is the affected replica-set. As noted above with respect to FIG. 2, the affected sub-cluster 121 includes the affected replica-set 220, and the affected sub-cluster 121 may include the replica-set 230, which may be a spare replica-set.

In operation 420, the failure response module 310 copies data (e.g., up to all of the data) from the affected replica-set 220 to a spare replica-set. For example, the replica-set 230 may be marked as a spare replica-set, and the failure response module 310 may copy the data to the replica-set 230. The copy of the data may be in response to the detecting of the failed data volume 222 (e.g., in operation 410). This may have the effect of restoring the level of data redundancy previously provided by the replica-set 220. Upon completion of operation 420, the replica-set 230 provides this level of data redundancy.

In operation 430, the coordinator module 320 marks one or more of the non-failed data volumes of the affected replica-set 220 as being inactive (e.g., nonoperational or otherwise unavailable for normal operation). For example, all of the non-failed data volumes (e.g., data volumes 223 and 224) of the affected replica-set 220 may be marked as inactive. The marking of these non-failed data volumes may be performed in response to the detecting of the failed data volume 222 (e.g., in operation 410). The network-based data storage system 105 may be configured to avoid using replica-sets that have been marked as being inactive. Accordingly, when the replica-set 220 becomes affected by the failed data volume 222, the entirety of the affected replica-set 220 may be taken off-line (e.g., pending repair or replacement of the failed data volume 222).

In operation 440, the coordinator module 320 detects that the failed data volume 222 is no longer a failed data volume (e.g., that the data volume 222 has been fixed or has otherwise become operational again). As examples, the failed data volume 222 may be reconfigured, repaired, replaced, or any suitable combination thereof, at some point in time after operation 410, in which the failure of the data volume 222 is detected. Accordingly, in operation 440, the coordinator module 320 may detect that the data volume 222 has been reconfigured, repaired, replaced, or any suitable combination thereof. In some example embodiments, the coordinator module 320 detects a replacement of the failed data volume 222 with a substitute data volume (e.g., a newly installed or newly configured data volume in the storage machine 122) within the affected replica-set 220. This detection may enable the data management machine 110 to initiate a process of bringing the entirety of the affected replica-set 220 back online (e.g., as an available spare replica-set for use in the event another replica-set is affected by a data volume failure).

In operation 450, the coordinator module 320 marks the non-failed data volumes (e.g., data volumes 223 and 224) of the affected replica-set 220 as being active (e.g., operational, or otherwise available for normal operation). For example, the non-failed data volumes that were marked as being inactive in operation 430 (e.g., data volumes 223 and 224) may be marked as being active again in operation 450. The marking of these non-failed data volumes may be performed in response to operation 440, in which the coordinator module 320 detects that the failed data volume 222 is no longer in a failed state. For example, the marking of these non-failed data volumes may be performed in response to detecting a replacement of the failed data volume 222 with a substitute data volume (e.g., with a newly configured or newly installed data volume within the storage machine 122). According to various example embodiments, operation 450 may include the marking of the substitute data volume as similarly being active (e.g., operational, or otherwise available for normal operation). This may have the effect of returning the entirety of the affected replica-set 220 to an active status (e.g., as an available spare replica-set).

As shown in FIG. 5, the method 400 may include one or more of operations 530 and 535. In some example embodiments, the coordinator module 320 may actively monitor the proportion of spare replica-sets in a sub-cluster (e.g., sub-cluster 121) and may reconfigure that sub-cluster to maintain a predetermined proportion of spare replica-sets. Hence, operation 530 may be performed after operation 430 and may be performed in response to initiation or completion of operation 430. In operation 530, the coordinator module 320 determines a spare percentage (e.g., a first spare percentage) for the sub-cluster 121 (e.g., a first sub-cluster). The spare percentage may represent a percentage (as an example of a proportion) of the replica-sets (e.g., replica-sets 220, 230, and 240) in the sub-cluster 121 that are marked as being spares. In some example embodiments, the spare percentage is a percentage of the total number of replica-sets (e.g., three replica-sets total or 3000 replica-sets total). In other example embodiments, the spare percentage is a percentage of the total storage capacity (e.g., measured in terabytes or petabytes). In further example embodiments, the spare percentage is a percentage of the total number of data volumes (e.g., nine data volumes total or 9000 data volumes total).

In operation 535, the coordinator module 320 reconfigures the monitored sub-cluster 121, and this reconfiguration of the sub-cluster 121 may be based on the spare percentage determined (e.g., calculated) in operation 530. As an example, operation 536 may be performed as part (e.g., a precursor task, a subroutine, or a portion) of operation 535. In operation 536, the coordinator module 320 increases the spare replica-sets in the sub-cluster 121 based on the spare percentage (e.g., in comparison to a predetermined threshold minimum value, a predetermined target value, or both). For example, the coordinator module 320 may add one or more replica-sets (e.g., from another sub-cluster, such as the sub-cluster 126) in response to the spare percentage falling below a threshold minimum value for the spare percentage. This may have the effect of changing the spare percentage (e.g., first spare percentage) toward a target value (e.g., a policy or goal of maintaining 15% spare replica-sets throughout all sub-clusters 121 and 126 in the network-based data storage system 105).

As another example, operation 537 may be performed as part of operation 535. In operation 537, the coordinator module 320 decreases the spare replica-sets in the sub-cluster 121 based on the spare percentage (e.g., in comparison to a predetermined threshold maximum value, or a predetermined target value, or both). For example, the coordinator module 320 may remove one or more replica-sets from the sub-cluster 121 (e.g., and reallocate them to another sub-cluster, such as a sub-cluster 126) in response to the spare percentage rising above a threshold maximum value for the spare percentage. This may similarly have the effect of changing the spare percentage (e.g., first spare percentage) toward a target value (e.g., a preference or configuration parameter that specifies 15% spare replica-sets throughout the network-based data storage system 105).

In some example embodiments, operations 530 and 535 are performed between operation 410 (e.g., detecting the failure of the data volume 222) and operation 440 (e.g., detecting a replacement of the failed data volume 222 with a substitute data volume). That is, a reconfiguration of the sub-cluster 121 may occur while the failed data volume 222 is in its failed state, and its replica-set 220 is affected by this failure.

In reconfiguring the sub-cluster 121, the coordinator module 320 may reallocate one or more replica-sets between or among sub-clusters (e.g., by redefining the sub-cluster 121 so that a spare replica-set from another sub-cluster is added to the sub-cluster 121, or by redefining the sub-cluster 121 so that another sub-cluster gains a spare replica-set at the expense of the sub-cluster 121). According to some example embodiments, in reconfiguring the sub-cluster 121, the coordinator module 320 may reallocate one or more data volumes between or among replica-sets (e.g., by redefining the replica-set 240 to include an additional data volume, such as the data volume 244, or by allocating the data volume 234 from the replica-set 230 to the replica-set 240).

In certain example embodiments, operations 530 and 535 are repeated after operation 450, in which the coordinator module 320 marks the affected replica-set 220 (e.g., its non-failed data volumes previously marked as spares, plus its newly substituted data volume) as being a newly available spare replica-set. That is, the coordinator module 320 may continuously monitor the spare percentage for some or all of the sub-clusters in the network-based data storage system 105, and the coordinator module 320 may reconfigure one or more sub-clusters to bring their spare percentages closer to a target value (e.g., 15% spares).

As shown in FIG. 6, the method 400 may include one or more of operations 630 and 635. In some example embodiments, the coordinator module 320 may actively monitor the proportion of spare replica-sets in multiple sub-clusters (e.g., simultaneously or contemporaneously) and may reconfigure one or more of these sub-clusters to maintain a predetermined proportion of spare replica-sets. Hence, operation 630 may be performed after operation 430 (e.g., before, during, or after operation 530) and may be performed in response to initiation or completion of operation 430, operation 530, or both. In operation 630, the coordinator module 320 determines a spare percentage (e.g., a second spare percentage) for the sub-cluster 126 (e.g., a second sub-cluster). This spare percentage may represent a percentage (as an example of a proportion) of the replica-sets (e.g., replica-sets 250, 260, and 270) in the sub-cluster 126 that are marked as being spares. In some example embodiments, this spare percentage is a percentage of the total number of replica-sets (e.g., three replica-sets total or 5000 replica-sets total). In other example embodiments, the spare percentage is a percentage of the total storage capacity (e.g., measured in exabytes or zettabytes). In further example embodiments, the spare percentage is a percentage of the total number of data volumes (e.g., nine data volumes total or 15,000 data volumes total).

In example embodiments that include operations 530 and 630, operation 635 may be performed to reconfigure the sub-clusters 121 and 126 in a mutually complementary manner. In operation 635, the coordinator module 320 reconfigures both of these sub-clusters 121 and 126, and this reconfiguration may be based on their spare percentages (e.g., first and second spare percentages) determined in operations 530 and 630.

As an example, operation 636 may be performed as part (e.g., a precursor task, a subroutine, or a portion) of operation 635. In operation 636, the coordinator module 320 reallocates one or more spare replica-sets in the sub-cluster 126 to the sub-cluster 121. This reallocation may be based on one or more of the spare percentages for the sub-clusters 121 and 126 (e.g., in comparison to a predetermined threshold minimum value, a predetermined target value, a predetermined threshold maximum value, or any suitable combination thereof). For example, the coordinator module 320 may reallocate one or more replica-sets from the sub-cluster 126 to the sub-cluster 121 in response to the spare percentage of the sub-cluster 121 (e.g., the first spare percentage) falling below a threshold minimum value (e.g., 10% spares), the spare percentage of the sub-cluster 126 (e.g., the second spare percentage) rising above the threshold minimum value (e.g., 10% spares), the spare percentage of the sub-cluster 126 (e.g., the second spare percentage) rising above a threshold maximum value (e.g., 20% spares), the spare percentage of the sub-cluster 121 (e.g., the first spare percentage) falling below a target value (e.g., 15% spares), the spare percentage of the sub-cluster 126 (e.g., the second spare percentage) rising above the target value (e.g., 15% spares), the spare percentage of the sub-cluster 121 (e.g., the first spare percentage) being less than the spare percentage of the sub-cluster 126 (e.g., the second spare percentage), or any suitable combination thereof. This may have the effect of changing one or both of these spare percentages (e.g., first spare percentage and second spare percentage) toward the target value (e.g., a policy or goal of maintaining 15% spare replica-sets throughout the network-based data storage system 105).

As another example, operation 637 may be performed as part of operation 635. In operation 637, the coordinator module 320 reallocates one or more spare replica-sets in the sub-cluster 121 to the sub-cluster 126. This reallocation may be based on one or more of the spare percentages for the sub-clusters 121 and 126 (e.g., in comparison to a predetermined threshold minimum value, a predetermined target value, a predetermined threshold maximum value, or any suitable combination thereof). For example, the coordinator module 320 may reallocate one or more replica-sets from the sub-cluster 121 to the sub-cluster 126 in response to the spare percentage of the sub-cluster 121 (e.g., the first spare percentage) rising above a threshold maximum value (e.g., 20% spares), the spare percentage of the sub-cluster 126 (e.g., the second spare percentage) falling below a threshold maximum value (e.g., 20% spares), the spare percentage of the sub-cluster 126 (e.g., the second spare percentage) falling below a threshold minimum value (e.g., 10% spares), the spare percentage of the sub-cluster 121 (e.g., the first spare percentage) rising above a target value (e.g., 15% spares), the spare percentage of the sub-cluster 126 (e.g., the second spare percentage) falling below the target value (e.g., 15% spares), the spare percentage of the sub-cluster 121 (e.g., the first spare percentage) being greater than the spare percentage of the sub-cluster 126 (e.g., the second spare percentage), or any suitable combination thereof. This may likewise have the effect of moving one or both of these spare percentages (e.g., first spare percentage and second spare percentage) toward the target value (e.g., a policy or goal of maintaining 15% spare replica-sets throughout the network-based data storage system 105).

In some example embodiments, operations 630 and 635 are performed between operation 410 (e.g., detecting the failure of the data volume 222) and operation 440 (e.g., detecting a replacement of the failed data volume 222 with a substitute data volume). That is, a mutual reconfiguration of the sub-clusters 121 and 126 may occur while the failed data volume 222 is in its failed state, and its replica-set 220 is affected by this failure.

In reconfiguring the sub-clusters 121 and 126, the coordinator module 320 may reallocate one or more replica-sets between or among these sub-clusters 121 and 126 (e.g., by redefining the sub-cluster 121 so that the replica-set 270 from the sub-cluster 126 is added to the sub-cluster 121, or by redefining the sub-cluster 121 so that the sub-cluster 126 gains the replica-set 240 at the expense of the sub-cluster 121). According to some example embodiments, in reconfiguring the sub-clusters 121 and 126, the coordinator module 320 may reallocate one or more data volumes between or among replica-sets (e.g., by redefining the replica-set 270 to include an additional data volume, such as the data volume 244).

In certain example embodiments, operations 630 and 635 are repeated after operation 450, in which the coordinator module 320 marks the affected replica-set 220 (e.g., its non-failed data volumes previously marked as spares, plus its newly substituted data volume) as being a newly available spare replica-set. That is, as noted above, the coordinator module 320 may continuously monitor the spare percentages for some or all of the sub-clusters in the network-based data storage system 105, and the coordinator module 320 may reconfigure one or more sub-clusters to bring their spare percentages closer to a target value (e.g., 15% spares).

According to various example embodiments, one or more of the methodologies described herein may facilitate allocation of replica-sets in a storage cluster within a network-based data storage system. Moreover, one or more of the methodologies described herein may reduce or eliminate the risk of reshuffling an entire data set (e.g., multiple replica-sets) in response to a failed data volume within a replica-set. Hence, one or more the methodologies described herein may facilitate efficient management of storage clusters, sub-clusters, replica-sets, data volumes, or any suitable combination thereof, in operating and maintaining a network-based data storage system.

When these effects are considered in aggregate, one or more of the methodologies described herein may obviate a need for certain efforts or resources that otherwise would be involved in operating and maintaining a network-based data storage system. Efforts expended by a user (e.g., a system administrator) in allocating (e.g., reallocating) replica-sets in response to a data volume failure may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 7:
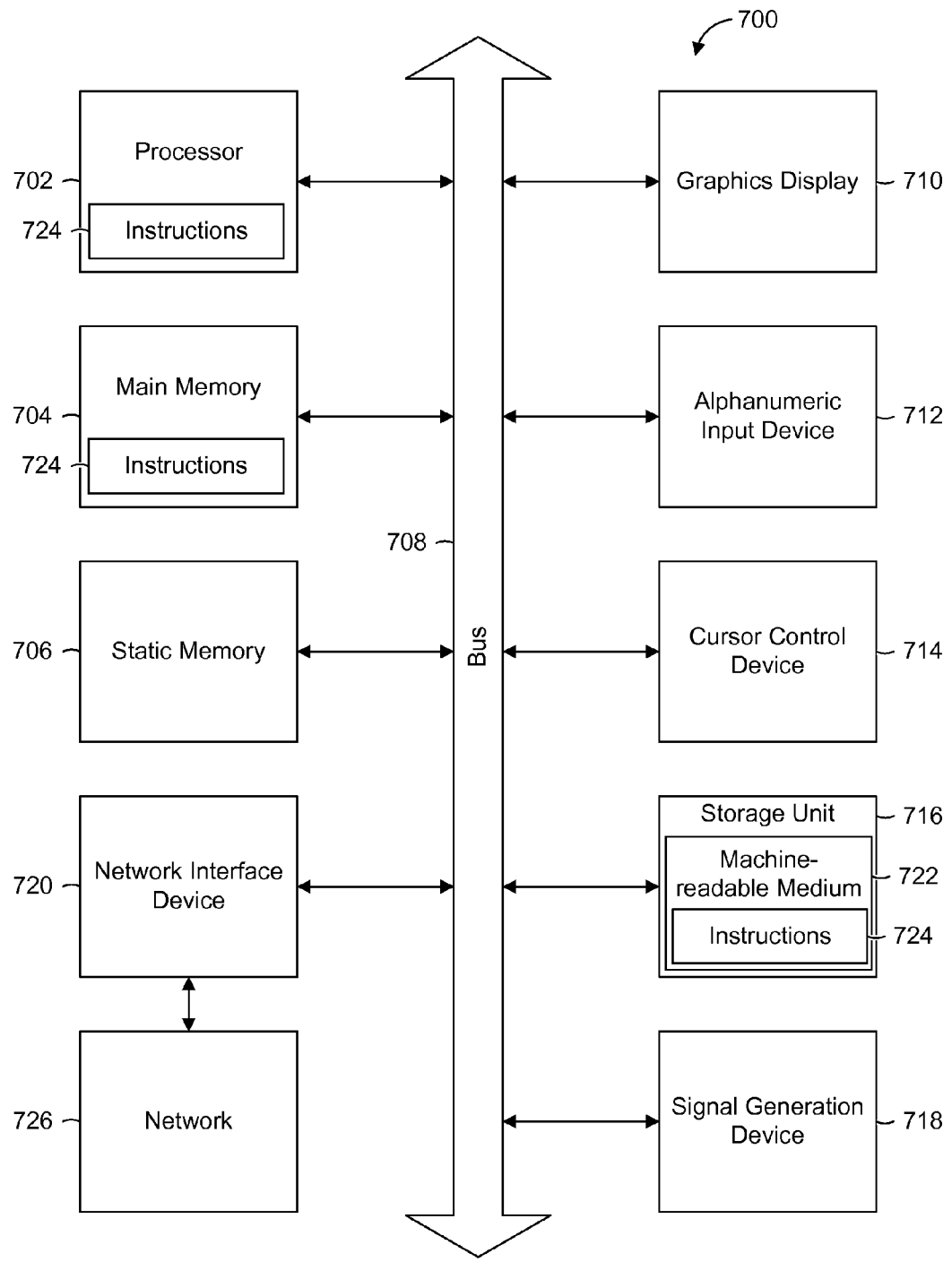
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed, in whole or in part. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which are stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media, in particular, tangible and non-transitory machine-readable media. The instructions 724 may be transmitted or received over a network 726 (e.g., network 190) via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    detecting a failed data volume in a sub-cluster among multiple sub-clusters within a cluster of data storage machines,
        the sub-cluster including an affected replica-set with e failed data volume and including a spare replica-set,
        the affected replica-set being a first group of mirrored data volumes,
        the spare replica-set being a second group of mirrored data volumes;
    marking non-failed data volumes of the affected replica-set as inactive in response to the detecting of the failed data volume in the affected replica-set, the marking of the non-failed data volumes being performed by a processor of a machine;
    determining a spare percentage for the sub-cluster, the spare percentage indicating a proportion of spare replica-sets among multiple replica-sets in the sub-cluster of data storage machines;
    copying data from the affected replica-set to the proportion of spare replica-set in response to the detecting of the failed data volume;
    detecting a replacement of the failed data volume with a substitute data volume in the affected replica-set; and
    marking the non-failed data volumes and the substitute volume as a further spare replica-set in response to the detecting of the replacement of the failed data volume.

2. The method of claim 1 further comprising
    reconfiguring the sub-cluster based on the spare percentage that indicates the proportion of spare replica-sets in the sub-cluster.

3. The method of claim 2, wherein:
    the reconfiguring of the sub-cluster includes increasing a number of replica-sets in the sub-cluster in response to the spare percentage falling below a threshold minimum value.

4. The method of claim 2, wherein:
    the reconfiguring of the sub-cluster includes decreasing a number of replica-sets in the sub-cluster in response to the spare percentage rising above a threshold maximum value.

5. The method of claim 2, wherein:
the reconfiguring of the sub-cluster is performed between the detecting of the failed data volume and the detecting of the replacement of the failed data volume.

6. The method of claim 1, wherein:
the spare percentage for the sub-cluster is a first spare percentage for a first sub-cluster among the multiple sub-clusters; and the method further comprises
determining a second spare percentage for a second sub-cluster within the cluster of data storage machines,
the second spare percentage indicating a proportion of spare replica-sets among multiple replica-sets in the second sub-cluster.

7. The method of claim 6 further comprising:
reconfiguring the first and second sub-clusters based on the first and second spare percentages that indicate proportions of spare replica-sets in the first and second sub-clusters.

8. The method of claim 7, wherein:
the reconfiguring of the first and second sub-clusters includes reallocating a further replica-set from the second sub-cluster to the first sub-cluster in response to the first spare percentage being below a threshold minimum value and in response to the second spare percentage being above the threshold minimum value.

9. The method of claim 7, wherein:
the reconfiguring of the first and second sub-clusters includes reallocating a further replica-set from the second sub-cluster to the first sub-cluster in response to the first spare percentage being below a threshold minimum value and in response to the second spare percentage being above a threshold maximum value.

10. The method of claim 7, wherein:
the reconfiguring of the first and second sub-clusters includes reallocating a further replica-set from the second sub-cluster to the first sub-cluster in response to the first spare percentage being below the second spare percentage.

11. The method of claim 7, wherein:
the reconfiguring of the first and second sub-clusters causes the first spare percentage and the second spare percentage to change toward a predetermined target value.

12. The method of claim 7, wherein:
the reconfiguring of the first and second sub-clusters is performed between the detecting of the failed data volume and the detecting of the replacement of the failed data volume.

13. The method of claim 1, wherein:
the first group of mirrored data volumes is configured to provide mutual redundancy to its data volumes; and
the second group of mirrored data volumes is configured to provide mutual redundancy to its data volumes.

14. A non-transitory machine-readable storage medium comprising instructions that, when executed by one or more processors of a machine, cause the machine to perform operations comprising:
detecting a failed data volume in a sub-cluster among multiple sub-clusters within a cluster of data storage machines,
the sub-cluster including an affected replica-set with the failed data volume and including a spare replica-set,
the affected replica-set being a first group of mirrored data volumes,
the spare replica-set being a second group of mirrored data volumes;
marking non-failed data volumes of the affected replica-set as inactive in response to the detecting of the failed data volume in the affected replica-set;
determining a spare percentage for the sub-cluster, the spare percentage indicating a proportion of spare replica-sets among multiple replica-sets in the sub-cluster of data storage machines;
copying data from the affected replica-set to the proportion of spare replica-set n response to the detecting of the failed data volume;
detecting a replacement of the failed data volume with a substitute data volume in the affected replica-set; and
marking the non-failed data volumes and the substitute volume as a further spare replica-set in response to the detecting of the replacement of the failed data volume.

15. The non-transitory machine-readable storage medium of claim 14, wherein:
the spare percentage for the sub-cluster is a first spare percentage for a first sub-cluster among the multiple sub-clusters, and the operations further comprise:
determining the first spare percentage for the first sub-cluster,
the first spare percentage indicating a proportion of spare replica-sets among multiple replica-sets in the first sub-cluster of data storage machines;
determining a second spare percentage for a second sub-cluster among multiple sub-clusters,
the second spare percentage indicating a proportion of spare replica-sets among multiple replica-sets in the second sub-cluster; and
reconfiguring the first and second sub-clusters based on the first and second spare percentages that indicate proportions of spare replica-sets in the first and second sub-clusters.

16. The non-transitory machine-readable storage medium of claim 14, wherein:
the reconfiguring of the first and second sub-clusters causes a first spare percentage and a second spare percentage to change toward a predetermined target value.

17. A system comprising:
a failure response module configured to:
detect a failed data volume in a sub-cluster among multiple sub-clusters within a cluster of data storage machines,
the sub-cluster including an affected replica-set with the failed data volume and including a spare replica-set,
the affected replica-set being a first group of mirrored data volumes,
the spare replica-set being a second group of mirrored data volumes; and
determine a spare percentage for the sub-cluster, the spare percentage indicating a proportion of spare replica-sets among multiple replica-sets in the sub-cluster of data storage machines;
copy data from the affected replica-set to the proportion of spare replica-set in response to the detecting of the failed data volume; and
a processor configured by a coordinator module to:
mark non-failed data volumes of the affected replica-set as inactive in response to the detecting of the failed data volume in the affected replica-set;
detect a replacement of the failed data volume with a substitute data volume in the affected replica-set; and mark the non-failed data volumes and the substitute volume as a further spare replica-set in response to the detecting of the replacement of the failed data volume.

18. The system of claim 17, wherein:

the spare percentage for the sub-cluster is a first spare percentage for a first sub-cluster among the multiple sub-clusters; and the coordinator module further configures the processor to:

determine the first spare percentage for the first sub-cluster, the first spare percentage indicating a proportion of spare replica-sets among multiple replica-sets in the first sub-cluster of data storage machines;

determine a second spare percentage for a second sub-cluster among multiple sub-clusters,
the second spare percentage indicating a proportion of spare replica-sets among multiple replica-sets in the second sub-cluster; and reconfigure the first and second sub-clusters based on the first and second spare percentages that indicate proportions of spare replica-sets in the first and second sub-clusters.

19. The system of claim 17, wherein:

coordinator module configures the processor to reconfigure the first and second sub-clusters before the replacement of the failed data volume.

* * * * *